000
United States Patent [19]

Westfall et al.

[11] 4,227,061
[45] Oct. 7, 1980

[54] METHOD AND APPARATUS FOR CLADDING A METAL ROD WITH ANOTHER METAL

[75] Inventors: Lee R. Westfall, McKeesport; Malcolm J. Fraser, Pittsburgh, both of Pa.

[73] Assignee: Copperweld Corporation, Pittsburgh, Pa.

[21] Appl. No.: 743,459

[22] Filed: Nov. 19, 1976

[51] Int. Cl.³ .............. B23K 13/00; B23K 11/00; H05B 6/02
[52] U.S. Cl. .............. 219/9.5; 219/10.47; 219/10.41; 219/58; 219/148; 228/130; 228/148
[58] Field of Search ............. 219/9.5, 10.47, 8.5, 219/7.5, 6.5, 10.41, 10.53, 10.73, 56, 58, 148, 149, 150, 154, 156, 102, 104, 76, 118, 10.75, 81, 83, 79, 103, 107, 152, 155, 158, 161; 228/129, 130, 219, 220, 148

[56] References Cited

U.S. PATENT DOCUMENTS

| 2,373,116 | 4/1945 | Hobrock | 219/9.5 UX |
|---|---|---|---|
| 3,220,107 | 11/1965 | Clark | 228/130 |
| 3,408,727 | 11/1968 | Dion | 228/130 |
| 3,427,430 | 2/1969 | Trautman et al. | 219/50 |
| 3,592,998 | 7/1971 | Derclaye | 219/58 |
| 3,714,701 | 2/1973 | Dion et al. | 228/130 |
| 3,787,656 | 1/1974 | Matsumoto | 219/104 |

Primary Examiner—B. A. Reynolds
Assistant Examiner—Philip H. Leung
Attorney, Agent, or Firm—Brown, Flick & Peckham

[57] ABSTRACT

A metal rod is supplied to a pair of bonding rolls provided with peripheral grooves forming a substantially circular roll pass that also receives at opposite sides of the rod a pair of metal strips of a different metal than that of the rod. The rolls press the strips against the rod and pull all three together through the roll pass, with the strips bent around the rod to enclose it. Before the strips reach the pass, an electric current passes through a length of each one to heat it to a solid-phase bonding temperature and to burn off contaminants. Also, before the rod reaches the rolls, it is heated to a solid-phase bonding temperature by means of an electric induction coil encircling it while it is passing through an enclosure maintained full of a gas providing a controlled atmosphere around the heated portion of the rod. The diameter of the roll pass is small enough to reduce the diameter of the product therein and simultaneously cause solid-phase bonding together of the heated strips and heated rod.

2 Claims, 4 Drawing Figures

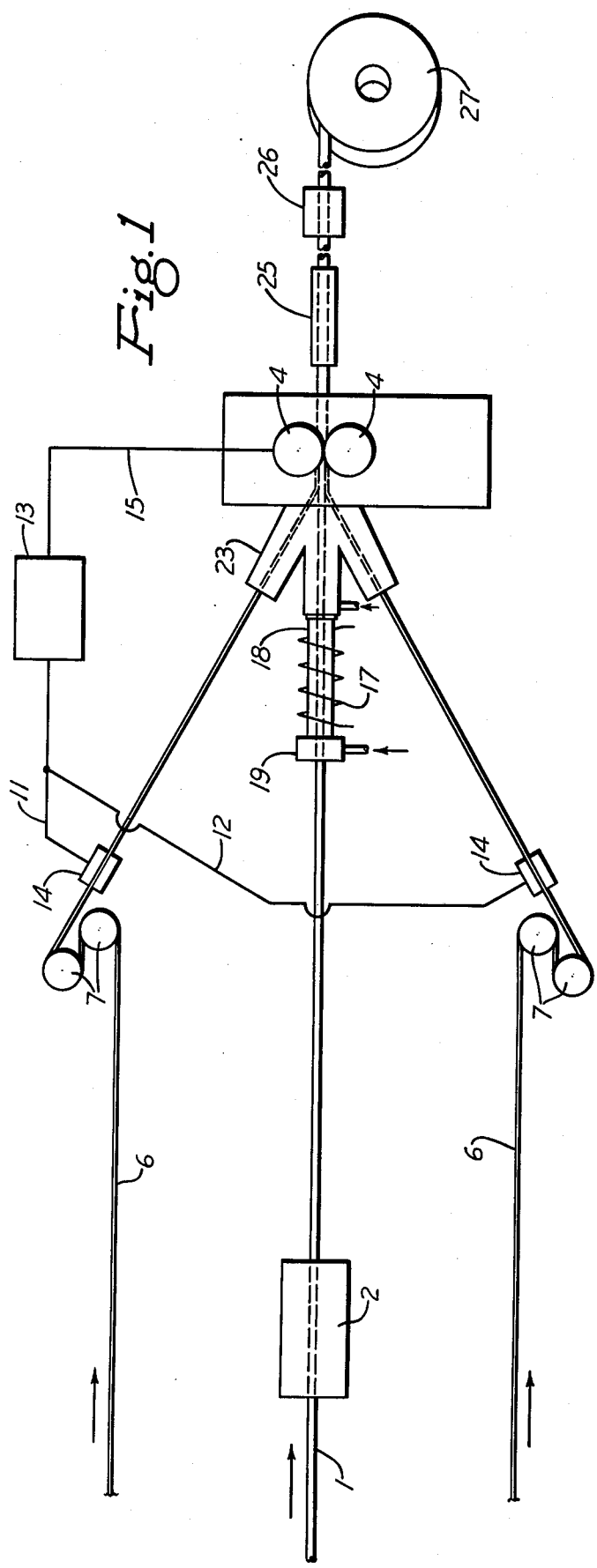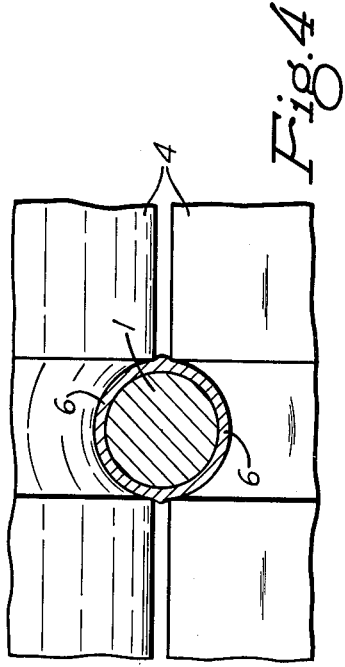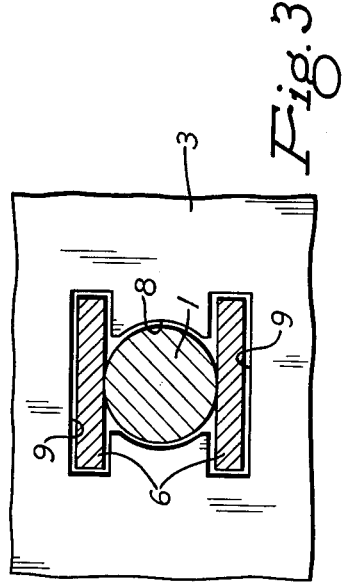

METHOD AND APPARATUS FOR CLADDING A METAL ROD WITH ANOTHER METAL

U.S. Pat. No. 3,714,701 discloses a process for cladding a traveling metal rod with a dissimilar metal sheath formed from two traveling strips that are curved transversely to fit around the rod. Before the strips and the rod come together, predetermined lengths of all three are heated electrically by the resistance they offer to an electric current flowing through them. After passing through an oxide-reducing retort, the heated strips and rod are pressed together by bonding rolls that reduce the diameter of the product and cause solid-phase bonding together of the strips and rod. Although the patent discloses bonding copper strips to a steel rod, it has been found that using such a method to form copper clad steel rods, especially high carbon steel rods, does not produce a satisfactory yield expectancy when they are to be drawn down to a smaller size, because during drawing the wire often breaks.

A great deal of time and thought was given to the problem, first in trying to find out what was causing the breaks and then how to prevent them. Eventually, it was found that "hot tearing" was occurrring as the composite underwent reduction by the bonding rolls. That is, during the cladding process, the metallurgical properties of local areas of the rod were changed to such an extent that it was weakened and would break during drawing, but it was not clear at first as to what was causing the trouble. After lengthy investigation, it was decided that the defective areas of the rod were due to local overheating and that the overheating was caused by high current density flow between the rod and the copper strips as they came together just before entering the roll pass, the current flow apparently being due to short circuiting of the electric resistance heating current from the steel to the copper, with the current then flowing through the copper strips to ground as a path having less resistance than that provided by the steel rod.

The next thing that was done was an attempt to find a way to overcome this difficulty. One suggestion was that the rod be grounded before it was engaged by the copper strips but, technically, this was too difficult to do and could result in overheated areas anyway. The location of the electric contacts on the rod and strips was changed, the speed of the material was varied and so was the voltage, all in attempts to change the temperature profile along the length of the steel rod and thereby alter its resistance with distance from the roll bite in order to lower the voltage potential difference between it and the copper strips at first contact, but that did not solve the problem either. The same unsatisfactory result occurred when it was attempted to lower the voltage potential by adding gas heat to the steel rod. It also was proposed to inhibit current flow at the point of contact of the steel and copper by not cleaning the surface of one or the other, or both, so that there would be sufficient resistance to flow of electricity from the rod to the copper strips, but the trouble with that solution was that in order to bond the copper and steel together when one of the meeting surfaces is dirty, it would be necessary for the bonding rolls to exert greater pressure and take a greater reduction. The greater the reduction, the higher the resulting maximum-minimum ratio between the thickest and thinnest parts of the copper cladding, and that is uneconomical because it wastes copper by requiring thicker strips in order to ensure that the copper coating will have sufficient thickness in its thinnest areas to meet certain customer product specifications. Other solutions to the problem were considered too, but for one reason or another they had to be discarded until the present invention was conceived after several weeks' work on the problem.

It is among an object of this invention to provide for encasing a metal rod with one or more transversely curved metal strips by a solid-phase bonding process, which involves electrically heating the rod and strips, which avoids excessive wear of the processing tools, and which will produce a product that will not be subject to hot tearing during roll bonding nor metallurgical degradation of structure leading to processing difficulties subsequent to cladding.

The preferred embodiment of the invention is illustrated in the accompanying drawings, in which FIG. 1 is a schematic side view of apparatus for practicing the process;

FIGS. 3 and 4 are further enlarged vertical sections taken on the lines III—III and IV—IV, respectively, of FIG. 2.

Figure 2:
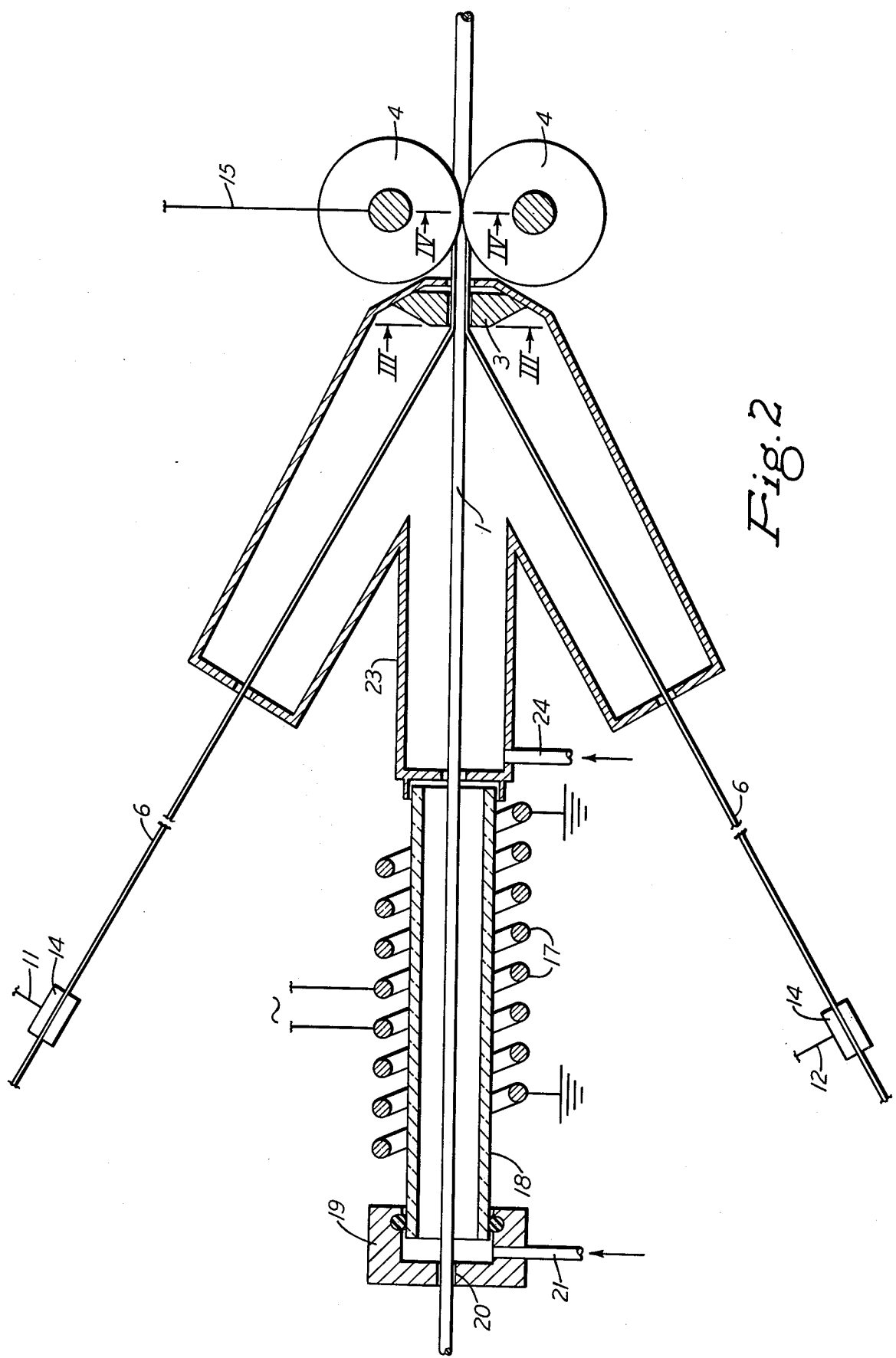
FIG. 2 is an enlarged fragmentary vertical section.

Referring to the drawings, a metal rod 1 from a suitable source of supply, such as a reel, travels forward through a surface preparation device 2 of any desired type. It may be in the form of rotating brushes that clean the surface of the rod, an acid-cleaning chamber, or a shot-blasting housing for example. From this surface cleaning device the rod moves forward through a guide 3 (FIG. 2) supported close to the entry of a roll pass between two driven bonding rolls 4, each provided with a substantially semicircular groove as shown in FIG. 4.

At the same time, two flat strips 6 of metal different from the metal of the rod are fed forward beside the top and bottom sides of the rod and around tension control rolls 7. These strips may be supplied from reels (not shown). The two strips are in a plane that passes through the axis of the rod and that is perpendicular to the axes of the two bonding rolls. From the tension control rolls the strips converge and enter guide 3. As shown in FIG. 3, the guide has a circular passage 8 through it for the rod, the passage communicating at top and bottom with parallel rectangular passages 9 for the metal strips. As the strips pass through the guide, they are held against, or substantially in engagement with, the top and bottom of the steel rod. The width of the strips must be great enough for them to enclose the rod in the solid-phase bonding step that follows immediately. Their thickness depends upon the thickness desired for the cladding. If desired, the copper strips could be curved transversely before reaching guide 3, in which case guide passages 9 also would be curved.

Shortly after the flat strips and the rod leave the guide, they enter the roll pass, in which the rolls bend or curve the strips around the rod to enclose it. That is, each strip is bent transversely nearly halfway around the rod, with the edges of one strip adjacent the edges of the other. The driven rolls press the strips against the rod with enough force to provide the means for drawing the rod and strips forward continuously and also to reduce the diameter of the assembled product or composite passing between the rolls, during which the adjacent edges of the two strips are brought into engagement with each other. For best results, the effective reduction should be between approximately 8% and 16%, reductions toward the lower figure being preferred because they result in a smaller maximum-minimum copper thickness ratio and therefore, require less copper. To obtain a good bond between the copper and steel at such small reductions, the surface of the rod must be very clean and that would aggravate the hot tearing problem if the rod were heated by electric current flowing through it.

Although this invention is applicable to any metals forming a clad product, it is directed particularly to situations where the resistance of the rod or of the cladding strips to electric current flow would be materially greater than the resistance of the other component so that hot tearing could occur if the rod were subjected to resistance heating. There are several metal combinations in this category, the most common one being a carbon steel rod and copper strips. Steel rods above the 1015 carbon range have the most serious problem. Copper on nickel rods or stainless steel rods, nickel on steel and aluminum on steel are other examples where there is hot tear potential. For the rest of the description of this invention the rod will be referred to as steel and the strips as copper.

To permit the copper strips and the steel rod to be solid-phase bonded together by the rolls, the strips and rod are electrically heated to temperatures sufficient for that purpose. The temperature of the steel rod when it reaches the rolls should be about 1600° F. and not much lower than 1550° F. When the copper strips reach the rolls the strip temperature should be about 1050° F. or higher. This heating also removes contaminants from the rod and strips to provide clean bonding surfaces. Each strip is heated electrically by an electric current flowing through it, the resistance of the strip to the current flow causing its temperature to rise. To connect each strip in an electric circuit, wires 11 and 12 from a direct current power source 13 are connected to electric contact shoes 14, across which the strips slide before they reach guide 3, and another wire 15 connects the power source to the bonding rolls to complete the circuits. In this way the lengths or portions of the copper strips between the contacts and the rolls are heated by the current flowing through them.

It is a feature of this invention that although the steel rod is heated electrically, it is not heated in the same way as the strips because that was found to be unsatisfactory for the reasons given hereinbefore. According to this invention, the problem of hot tearing has been solved by heating the rod by means of an electrical induction coil 17 that encircles a short length of the rod. The coil is connected to a suitable source of alternating current. Extending through the coil but spaced from the rod is a protective nonconducting tube 18, such as a ceramic tube, joined at its rear end to a cap 19 provided with a small opening 20 through which the rod moves. This cap has a second opening connected by a pipe 21 to a source of gas, which may be a nonreactive gas such as nitrogen, a slightly oxidizing gas such as nitrogen with oxygen or water vapor mixed with it, or a reducing gas such as hydrogen or carbon monoxide. The gas is continuously delivered to tube 18 and escapes from its front end. The gas, which is under positive pressure in the tube, inhibits or limits oxidation of the rod that otherwise would occur due to the high temperature to which its surface is heated by the induction coil.

Immediately upon leaving tube 18 and without being exposed to the atmosphere, the steel rod enters a gas-filled positive-pressure chamber 23 that extends forward around the rod and guide 3 to a point close to the bonding rolls, where the chamber has an exit for the steel rod and copper strips. Chamber 23 also surrounds adjacent heated lengths of the copper strips and is provided with an inlet 24 for a reducing gas to remove any oxide that has formed on the rod and strips. The gas, such as dissociated ammonia, escapes from this chamber through the openings for the rod and strips. The escaping gas floods the area between the chamber and the roll pass to prevent reoxidation of the clean surfaces of the rod and strips before bonding. If the gas delivered to tube 18 is an oxide-reducing gas, it can be allowed to flow from the tube directly into chamber 23 to create a positive pressure therein, in which case a second gas need not be delivered to that chamber.

The cleaned and heated material rolled between the bonding rolls is solid-phase bonded together to form a copper-clad steel rod. This reduced composite, as shown in FIG. 1, then passes through suitably controlled cooling apparatus 25, after which it may travel through a skiving device 26 of known design for trimming off the two fins that may have been formed when the copper strips were bonded to each other in the roll pass. After that, the product is wound on a take-up reel 27 ready for use or for drawing down to a smaller diameter.

With the method and apparatus described herein there are no local hot spots on the product, no detrimental shorting of current flow and no hot tearing problem, so the product produced can be drawn down to a smaller size without breakage incidents, quality degradation such as grain boundary embrittlement, or excessive yield loss. Also, it is economical in its use of cladding material. Another advantage is that excessive wear of the apparatus is avoided by eliminating arcing at the guide and rolls. A still further advantage of this method and apparatus is that it permits the use of separate straight rods, such as from four to twenty feet long, that are too large in diameter to be coiled conveniently in a supply package like a smaller continuous rod. The reason, of course, is that no electric current flows through the rods, unlike in electric resistance heating, so a continuous rod is not required. Also, resistance heating of a large diameter rod, one inch for example, would require the grounding of an enormous amount of electrical power in direct resistance heating.

Although the invention has been described as using two cladding strips, it will be understood that it is not limited to two strips because the invention still would be practiced if one strip were bent around the rod or if three or more strips were equally spaced around the central core.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A method of cladding a metal rod with a dissimilar metal to form a product not subject to hot tearing, comprising continuously feeding the rod forward, continuously feeding metal cladding strips toward the rod for engagement with it, the strips having a different electrical resistance than the rod, passing electric current through a predetermined length of the strips to heat them by electrical resistance to a solid-phase bonding temperature before they engage the rod, simultaneously heating the rod to a solid-phase bonding temperature by electrical induction in a predetermined area before engagement by the strips, maintaining the surface of the heated portion of the rod substantially free from oxide before engagement by the strips, then substantially enclosing the heated rod with the heated strips to form a substantially circular composite, and pressing the heated strips against the heated rod with enough force to reduce the diameter of the composite and simultaneously solid-phase bond the strips and rod together.

2. Apparatus for cladding a metal rod with a dissimilar metal having a different electrical resistance than the rod to form a product not subject to hot tearing, comprising bonding rolls provided with peripheral grooves forming a substantially circular roll pass, means for supplying a metal rod to said pass, means for supplying cladding strips to the pass in circumferentially spaced relation around the rod, said pass being of such size as to cause said rolls to press the strips against the rod to pull the strips and rod together through the roll pass with the strips bent around the rod to enclose it and form a composite, means for connecting an electric circuit with each strip at spaced points to heat it to a solid-phase bonding temperature before it reaches said pass, an electric induction coil for encircling the rod before it reaches the rolls to heat the rod to a solid-phase bonding temperature as it moves through the coil, an enclosure for the heated rod, and means for maintaining said enclosure full of a controlled atmosphere, the roll pass being small enough to reduce the diameter of said composite and simultaneously cause solid-phase bonding together of the strips and heated rod.

* * * * *